United States Patent
Adkins et al.

(10) Patent No.: US 11,414,544 B2
(45) Date of Patent: Aug. 16, 2022

(54) ETHYLENICALLY UNSATURATED MACROMERS PRODUCED FROM A RESIDUE OF ISOCYANATE MANUFACTURING, RELATED PREFORMED STABILIZERS, POLYMER POLYOLS, FOAM-FORMING COMPOSITIONS AND FOAMS

(71) Applicant: Covestro LLC, Pittsburgh, PA (US)

(72) Inventors: Rick L. Adkins, Canonsburg, PA (US); Don S. Wardius, Pittsburgh, PA (US)

(73) Assignee: Covestro LLC, Pittsburgh, PA (US)

( * ) Notice: Subject to any disclaimer, the term of this patent is extended or adjusted under 35 U.S.C. 154(b) by 109 days.

(21) Appl. No.: 17/079,843

(22) Filed: Oct. 26, 2020

(65) Prior Publication Data

US 2021/0040316 A1     Feb. 11, 2021

Related U.S. Application Data

(62) Division of application No. 16/182,705, filed on Nov. 7, 2018, now Pat. No. 10,851,239.

(51) Int. Cl.

| | | |
|---|---|---|
| C08L 75/14 | (2006.01) | |
| C08G 18/10 | (2006.01) | |
| C08G 18/22 | (2006.01) | |
| C08G 18/48 | (2006.01) | |
| C08G 18/76 | (2006.01) | |
| C08G 18/81 | (2006.01) | |
| C08J 9/28 | (2006.01) | |
| C08J 9/38 | (2006.01) | |
| C08G 101/00 | (2006.01) | |

(52) U.S. Cl.
CPC .............. *C08L 75/14* (2013.01); *C08G 18/10* (2013.01); *C08G 18/227* (2013.01); *C08G 18/4816* (2013.01); *C08G 18/4841* (2013.01); *C08G 18/7614* (2013.01); *C08G 18/7664* (2013.01); *C08G 18/8108* (2013.01); *C08J 9/286* (2013.01); *C08J 9/38* (2013.01); *C08G 2101/00* (2013.01); *C08J 2205/05* (2013.01); *C08J 2375/14* (2013.01); *C08L 2203/14* (2013.01); *C08L 2312/02* (2013.01)

(58) Field of Classification Search
CPC .. C08G 18/10; C08G 18/227; C08G 18/3275; C08G 18/4816; C08G 18/4841; C08G 18/632; C08G 18/6681; C08G 18/727; C08G 18/7614; C08G 18/7621; C08G 18/7664; C08G 18/8108; C08G 2101/00; C08G 2110/0008; C08J 9/286; C08J 9/38; C08J 2205/05; C08J 2375/14; C08L 75/14; C08L 2203/14; C08L 2312/02

See application file for complete search history.

(56) References Cited

U.S. PATENT DOCUMENTS

| | | | |
|---|---|---|---|
| 3,073,788 A | 1/1963 | Hostettler et al. | |
| 3,953,393 A | 4/1976 | Ramlow et al. | |
| 4,119,586 A | 10/1978 | Shah | |
| 4,463,107 A | 7/1984 | Simroth et al. | |
| 4,506,040 A | 3/1985 | Raes et al. | |
| 4,904,704 A | 2/1990 | Nafziger et al. | |
| 5,324,774 A | 6/1994 | Nishikawa et al. | |
| 5,446,196 A | 8/1995 | Benedix et al. | |
| 5,753,750 A | 5/1998 | Slack et al. | |
| 5,804,648 A | 9/1998 | Slack | |
| 5,814,699 A | 9/1998 | Kratz et al. | |
| 5,837,794 A | 11/1998 | Slack et al. | |
| 6,013,731 A | 1/2000 | Holeschovsky et al. | |
| 6,624,209 B2 | 9/2003 | Kawamoto et al. | |
| 7,160,975 B2 | 1/2007 | Adkins et al. | |
| 7,759,423 B2 * | 7/2010 | Chauk ................ | C08G 18/68 524/769 |
| 8,835,565 B2 | 9/2014 | England et al. | |
| 9,505,881 B1 | 11/2016 | Adkins et al. | |
| 2010/0036082 A1 * | 2/2010 | Nakada .............. | C08G 18/4072 528/392 |
| 2013/0131204 A1 | 5/2013 | Fennis et al. | |
| 2014/0051779 A1 | 2/2014 | Casati et al. | |
| 2014/0275310 A1 | 9/2014 | Adkins et al. | |
| 2015/0274952 A1 | 10/2015 | Borella | |

FOREIGN PATENT DOCUMENTS

WO     2015165878 A1     11/2015

OTHER PUBLICATIONS

Poole, James et al.; "Powder Coating Compositions With a Polymeric Aromatic Product of an Aromatic Isocyanate Manufacturing Process"; U.S. Appl. No. 15/630,202; Jun. 22, 2017; Covestro LLC.
Pavlovich, George et al.; "Powder Coating Compositions With a Polymeric Aromatic Product of an Aromatic Isocyanate Manufacturing Process"; U.S. Appl. No. 15/630,320; Jun. 22, 2017; Covestro LLC.

* cited by examiner

*Primary Examiner* — John M Cooney
(74) *Attorney, Agent, or Firm* — Donald R. Palladino

(57) ABSTRACT

Disclosed are ethylenically unsaturated macromers produced using a residue of an isocyanate manufacturing process. Also disclosed are preformed stabilizers produced using such macromers, polymer polyols produced using such preformed stabilizers, foam-forming compositions produced using such polymer polyols, and foam produced using such compositions.

17 Claims, No Drawings

ETHYLENICALLY UNSATURATED MACROMERS PRODUCED FROM A RESIDUE OF ISOCYANATE MANUFACTURING, RELATED PREFORMED STABILIZERS, POLYMER POLYOLS, FOAM-FORMING COMPOSITIONS AND FOAMS

CROSS-REFERENCE TO RELATED APPLICATIONS

This application is a divisional of U.S. application Ser. No. 16/182,705, filed Nov. 7, 2018, entitled "Ethylenically Unsaturated Macromers Produced From a Residue of Isocyanate Manufacturing, Related Preformed Stabilizers, Polymer Polyols, Foam-Forming Compositions and Foams", which is incorporated herein by reference.

FIELD

The present specification relates generally to ethylenically unsaturated macromers produced using a residue of an isocyanate manufacturing process. The present specification also relates to preformed stabilizers produced using such macromers, polymer polyols produced using such preformed stabilizers, foam-forming compositions produced using such polymer polyols, and foam produced using such compositions.

BACKGROUND

Polymer polyols, i.e., dispersions of polymer particles in a polyol, are known to be useful in preparing polyurethane foams. Such polymer polyol compositions are typically used to produce two major types of polyurethane foams—slabstock and molded foams. Slabstock foams are used in the carpet, furniture and bedding industries. Primary uses of slabstock foam are as carpet underlay and furniture padding. High resiliency (HR) molded foam is the type of molded foam generally made. HR molded foams are used in the automotive industry for a number of applications ranging from molded seats to energy-absorbing padding.

Polymer polyols are typically produced by the in-situ polymerization of one or more vinyl monomers in a continuous polyol phase. This polymerization is often conducted with a pre-formed stabilizer to allow production of polymer polyols with a lower viscosity at higher solids content. In this process, a macromer is reacted with monomers to form a co-polymer of macromer and monomers, which is referred to as the pre-formed stabilizer. The pre-formed stabilizer then acts as a seed in the polymer polyol reaction.

Toluene diisocyanate ("TDI") is an important product for the manufacture of polyurethanes. It is manufactured by phosgenation of diamines followed by distillation to recover solvents and the diisocyanate(s). This distillation process results in a high molecular weight residue of the TDI (often referred to as "TDI residue") that is typically discarded as waste. Since TDI is manufactured in large quantities, such disposal can be expensive and otherwise undesirable. Nevertheless, the TDI residue is reproducible and consistent when samples are taken from the process and subjected to analysis to characterize the composition of the material.

As a result, it would also be desirable to take advantage of this reproducibility and consistency and identify valuable uses of TDI residue. In particular, since certain types of TDI residue are the product of a highly controlled, highly repeatable and reproducible process; are based on highly consistent raw materials; and are themselves very consistent over time in their composition and physical and chemical characteristics, it would be desirable to identify applications that would benefit from use of such a material as a raw material to produce another product.

The inventions described herein were made in view of the foregoing.

SUMMARY OF THE INVENTION

In certain respects, the present specification is directed to ethylenically unsaturated macromers. These ethylenically unsaturated macromers comprise the reaction product of a reaction mixture comprising: (a) an isocyanate residue; (b) a polyol having a hydroxyl number of 20 to 75 and a hydroxyl functionality of 2 to 8; and (c) a hydroxyl-reactive compound containing reactive ethylenic unsaturation.

The present specification is also directed to, among other things, pre-formed stabilizers produced from such ethylenically unsaturated macromers, polymer polyols produced from with pre-formed stabilizers, foam-forming compositions produced with such polymer polymers, methods for making foams from such compositions, and the resulting foams.

DETAILED DESCRIPTION

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As used herein, the following terms shall have the following meanings.

The term "isocyanate residue" means a non-distillable by-product produced by a polyisocyanate production process involving the reaction of an amine with phosgene.

The term "monomer" means the simple unpolymerized form of a chemical compound having relatively low molecular weight, e.g., acrylonitrile, styrene, methyl methacrylate, and the like.

The term "macromer" is synonymous with macromonomer and means any polymer or oligomer that has a functional group that can take part in further polymerization.

The phrase "polymerizable ethylenically unsaturated monomer" means a monomer containing ethylenic unsaturation (>C═C<, i.e. two double bonded carbon atoms) that is capable of undergoing free radically induced addition polymerization reactions.

The term "pre-formed stabilizer" means an intermediate obtained by reacting a macromer containing reactive unsaturation (e.g. acrylate, methacrylate, maleate, etc.) with one or more monomers (i.e. acrylonitrile, styrene, methyl methacrylate, etc.), with and at least one free radical initiator, in the presence of a polymer control agent (PCA) and, optionally, in a diluent, to give a co-polymer (i.e. a dispersion having e.g. a low solids content (e.g. <30%), or soluble grafts, etc.).

The phrase "polymer polyol" refers to such compositions which can be produced by polymerizing one or more ethylenically unsaturated monomers dissolved or dispersed in a polyol in the presence of a free radical catalyst to form a stable dispersion of polymer particles in the polyol. These polymer polyols have the valuable property, for example, that polyurethane foams and elastomers produced therefrom exhibit higher load-bearing properties than are provided by the corresponding unmodified polyols.

Certain embodiments of the inventions described in this specification are directed to ethylenically unsaturated macromers. As earlier indicated, these ethylenically unsaturated macromers comprise the reaction product of a reaction mixture comprising an isocyanate residue. In certain embodiments, the isocyanate residue has a content of bound isocyanate that is at least 0.1% by weight and/or less than 10% by weight, based on the total weight of the organic particulate and/or is the phosgenation product of toluene diamine containing less than 0.5% by weight of ortho-toluenediamine isomers, based on the total weight of toluene diamine. As used herein, "bound isocyanate" refers to isocyanate functionality covalently bonded to the crosslinked polymer that is in the isocyanate residue. In addition, the isocyanate residue may be substantially free (<10 ppm, such as <5 ppm), in some cases completely free (0 ppm), of isocyanate functionality that is not bound isocyanate.

More particularly, in some embodiments, the isocyanate residue is an organic particulate comprising: (i) a crosslinked polymer comprising aromatic groups, biuret groups, urea groups, and carbodiimide groups (and sometimes a content of isocyanate groups); and (ii) a high-boiling hydrocarbon. As used herein with reference to component (i) above, the term "polymer" encompasses oligomers and both homopolymers and copolymers; the prefix "poly" referring to two or more. Also, as used herein with reference to component (i) above, "crosslinked polymer" means that the chains of the polymer are linked to one another by covalent bonds so that the polymer, as a network, is insoluble in inert organic solvents and cannot be melted without decomposing.

The organic particulate that is included in the reaction mixture to form the macromers described herein is, in certain embodiments, the by-product of a process used to manufacture an aromatic polyisocyanate. More particularly, in certain embodiments, the organic particulate is produced by drying a mixture comprising: (i) a residue, i.e., a by-product, of a process for producing an aromatic polyisocyanate by the reaction of a corresponding amine with phosgene; and (ii) a high-boiling hydrocarbon. As used herein, the term "high-boiling hydrocarbon" encompasses pure hydrocarbons and industrial mixtures that have a boiling point which is different from the boiling point of the polyisocyanate produced by the process resulting in the residue by at least 150° C. at 15 mbar absolute pressure.

For example, in some embodiments, the organic particulate is the product of a process for the production of a pure, distilled aromatic polyisocyanate by (1) the reaction of the corresponding amine with phosgene in a suitable solvent and multi-stage distillative work-up of the isocyanate solution obtained to recover pure isocyanate, pure solvent and an isocyanate-containing residue, and (2) continuously feeding the residue obtained from the distillation process and from 2 to 50 weight % of a high-boiling hydrocarbon which is inert under the distillation conditions to a heated, product-agitating vacuum drier with a horizontal shaft. In such a process, the fraction of polyisocyanate still present is continuously distilled off from the residue at a temperature of from 160° to 280° C. and a pressure of from 2 to 50 mbar. The remaining residue is continuously discharged as a pourable, non-dusting, granular material, which is cooled and ground to a desired particle size.

Residues from the synthesis of any of a variety of aromatic polyisocyanates are suitable for use in the inventions described in this specification. Suitable such aromatic polyisocyanates include, but are not limited to, 1,3-phenylene diisocyanate, 1,4-phenylene diisocyanate, 2,6-toluene diisocyanate, 2,4-toluene diisocyanate, 1,3-xylylene diisocyanate, 1,4-xylylene diisocyanate, tetramethylxylene diisocyanate, 1,5-naphthalene diisocyanate, diphenyl oxide 4,4'-diisocyanate, 4,4'-methylenediphenyl diisocyanate, 2,4'-methylenediphenyl diisocyanate, 2,2'-diisocyanatodiphenylmethane, diphenylmethanediisocyanate, 3,3'-dimethyl-4,4'-biphenylene isocyanate, 3,3'-dimethoxy-4,4'-biphenylene diisocyanate, benzene, 1-[(2,4-diisocyanatophenyl)methyl]-3-isocyanato-2-methyl, 2,4,6-triisopropyl-m-phenylene diisocyanate, and triphenylmethane-4,4',4''-triisocyanate, tris(p-isocyanatophenyl)thiophosphate, among others.

The residue stream, i.e., that chemical mixture containing the by-product being formed during distillation of the amine/phosgene reaction mixture often contains from 20 to 80 weight %, such as 40 to 60 weight %, of monomeric isocyanate in addition to polymeric products. In the practice of the process described above, this isocyanate-containing residue may be fed to the drier separately from the hydrocarbons in a plurality of partial streams. In certain embodiments, at least a portion of the isocyanate-containing residue is mixed with the hydrocarbon and fed to the drier. The remainder of the residue may then be fed to the drier in one or more partial streams.

A continuously operating contact drier which has a double shell for heating, has a horizontal shaft which agitates the product and is heated is, in certain embodiments, used as the drier in the production of the organic particulate used in the production of the macromers of the present specification. In certain embodiments, the drier has a plurality of nozzles for product admission, one nozzle for product discharge, and vapor discharge nozzles of large dimensions for the isocyanate and solvent which are separated from the residue during the distillation. Both single-shaft driers and double-shaft or screw feed apparatuses may be used.

Condensate formed from vapors generated during the process (e.g., in a vapor offtake system) may be used to remove dust deposits such as those which may be formed on the walls of the apparatus at the point where vapors are removed from the system (e.g., the vapor offtake system). These condensates are often separately discharged.

In certain embodiments of the process for preparing the organic particulates used in producing the macromers of the present specification, the reactor is operated at a temperature of from 160° C. to 280° C., such as 200° C. to 250° C., under a pressure of from 2 to 50 mbar, such as 10 to 20 mbar, at a throughput of up to 250 kg/hour per m² of heating surface. The continuous distillation is often conducted in a product-agitating drier with a horizontal shaft, to which a condensation system is attached. Distillation is carried out in the presence of one or more hydrocarbons, which are admixed in an amount of from 1 to 50 weight %, such as 3 to 10 weight %, based on the weight of the residue being treated. Suitable hydrocarbons include, but are not limited to, asphalts, such as those which occur industrially as by-products in the refining of crude oil. Specific non-limiting examples of suitable bitumens are those of grades 6/12, 10/20, 20/30, 30/40, 40/50, 60/70, 80/100, 100/120, and 180/200.

Suitable processes and equipment for producing the organic particulates (c) suitable for use herein are also described in U.S. Pat. No. 5,446,196, at col. 2, line 18 to col. 4, line 2, the cited portion of which being incorporated herein by reference.

In certain embodiments, for purposes of the inventions described in this specification, the organic particulate produced as described above is ground to a mean particle size of at least 0.1 micron, such as at least 1 micron, at least 2 microns and no more than 100 microns, such as no more than 10 microns or no more than 5 microns. In certain embodiments, the organic particulate has a Mohs hardness of 2 to 4, and/or a specific gravity of 1.2 to 1.4. Furthermore, in certain embodiments, the ash content of the particulate is less than 0.5% by weight, and when heated under a nitrogen atmosphere, the particulate shows no discernable melting point. In certain embodiments, the particulate is insoluble in water at room temperature and pressure, and has a solubility of less than 5% at room temperature/pressure in any of the following organic solvents: acetone, chlorobenzene, xylenes, dimethylformamide, dimethylsulfoxide, dimethylacetamide, 1:1 mixture of acetone: aromatic 100, carbon disulfide, chloroform, methylene chloride, or tetrahydrofuran. It is not possible to analyze the particulate by SEC or NMR because of its relative insolubility in organic solvents. In certain embodiments, the content of high-boiling hydrocarbon in the organic particulate is from 1 to 10% by weight, such as 2 to 6% by weight, or 3 to 5% by weight, based on the total weight of the organic particulate.

In certain embodiments, the organic particulate is present in the reaction mixture used to produce the macromer in an amount of at least 0.01%, such as at least 0.1%, at least 1%, or, in some cases, at least 2% by weight and/or up to 10%, such as up to 8%, up to 6%, or, in some cases, up to 4% by weight, based on the total combined weight of the reactants used to produce the macromer.

As indicated, the reaction mixture used to produce the macromers of this specification includes a polyol having a hydroxyl number of 20 to 75, 20 to 50, or, in some cases 25 to 40, and a hydroxyl functionality of 2 to 8, such as 3 to 6. As used herein, the hydroxyl number is defined as the number of milligrams of potassium hydroxide required for the complete hydrolysis of the fully phthalylated derivative prepared from 1 gram of polyol. The hydroxyl number can also be defined by the equation:

$$OH = (56.1 \times 1000 \times f)/\text{mol. wt.}$$

where: OH: represents the hydroxyl number of the polyol, $f$: represents the functionality of the polyol, i.e. the average number of hydroxyl groups per molecule of polyol, and mol. wt. represents the molecular weight of the polyol. Unless otherwise indicated, the term molecular weight, when sued with reference to a polymer, refers to the number average molecular weight determined by gel-permeation chromatography (GPC) using a method based on DIN 55672-1 employing chloroform as the eluent with a mixed bed column (Agilent PL Gel; SDVB; 3 micron Pore dia: 1×Mixed-E+5 micron Pore dia: 2×Mixed-D), refractive index (RI) detection and calibrated with polyethylene glycol.

Examples of suitable polyols include alkylene oxide adducts of hydroxyl functional compounds such as ethylene glycol, propylene glycol, diethylene glycol, dipropylene glycol, tripropylene glycol, glycerin, trimethylolpropane, pentaerythritol, sorbitol, ethylenediamine, toluene diamine, etc. These alkylene oxide adducts may comprise propylene oxide, ethylene oxide, butylene oxide, styrene oxide, and mixtures thereof. It is possible for these starter compounds comprise 100% of an alkylene oxide such as, for example, propylene oxide, or a mixture of propylene oxide and a second alkylene oxide such as ethylene oxide or butylene oxide. When a mixture of alkylene oxides are used to form the polyol, mixtures of propylene oxide and ethylene oxide may be advantageous. Such mixtures may be added simultaneously (i.e. two or more alkylene oxide are added as co-feeds), or sequentially (one alkylene oxide is added first, and then another alkylene oxide is added). It is possibly to use a combination of simultaneous and sequential addition of alkylene oxides. In one embodiment, an alkylene oxide such as propylene oxide may be added first, and then a second alkylene oxide such as ethylene oxide added as a cap. The alkoxylation reaction may be catalyzed using any conventional catalyst including, for example, potassium hydroxide (KOH) or a double metal cyanide (DMC) catalyst.

Other suitable polyols include alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, etc., and alkylene oxide adducts of polyhydroxyalkanes other than those described above. Illustrative alkylene oxide adducts of polyhydroxyalkanes include, for example, alkylene oxide adducts of 1,3-dihydroxypropane, 1,3-dihydroxybutane, 1,4-dihydroxybutane, 1,4-, 1,5- and 1,6-dihydroxyhexane, 1,2-, 1,3-, 1,4-1,6- and 1,8-dihydroxyoctane, 1,10-dihydroxydecane, glycerol, 1,2,4-trihydroxybutane, 1,2,6-trihydroxyhexane, 1,1,1-trimethyl-olethane, 1,1,1-trimethylolpropane, pentaerythritol, caprolactone, polycaprolactone, xylitol, arabitol, sorbitol, mannitol, and the like.

Other polyols which can be employed include the alkylene oxide adducts of non-reducing sugars, wherein the alkoxides have from 2 to 4 carbon atoms. Non-reducing sugars and sugar derivatives include sucrose, alkyl glycosides such as methyl glycoside, ethyl glucoside, etc. glycol glucosides such as ethylene glycol glycoside, propylene glycol glucoside, glycerol glucoside, 1,2,6-hexanetriol glucoside, etc. as well as alkylene oxide adducts of the alkyl glycosides as disclosed in U.S. Pat. No. 3,073,788, the disclosure of which is herein incorporated by reference.

Other suitable polyols include the polyphenols and preferably the alkylene oxide adducts thereof wherein the alkylene oxides have from 2 to 4 carbon atoms. Among the polyphenols which are suitable include, for example bisphenol A, bisphenol F, condensation products of phenol and formaldehyde, the novolac resins, condensation products of various phenolic compounds and acrolein, including the 1,1,3-tris(hydroxy-phenyl)propanes, condensation products of various phenolic compounds and glyoxal, glutaraldehyde, other dialdehydes, including the 1,1,2,2-tetrakis (hydroxyphenol)ethanes, etc.

In some embodiments, the polyol has a hydroxyl functionality of from 3 to 6 and a hydroxyl number of from 25 to 40, and is prepared by reacting a starter such as glycerin, trimethylolpropane, pentaerythritol, dipentaerythritol, sorbitol, mannitol, etc., with alkylene oxides comprising at least one alkylene oxide such as, for example, propylene oxide and/or ethylene oxide. In some embodiments, the ethylene oxide comprises from 1 to 40% by weight, or from 5 to 30%, or from 10 to 25% by weight, based on the total weight of the polyol. In some embodiments, all or a portion of the ethylene oxide is added as a cap on the end of the polyol. Suitable amounts of ethylene oxide to be added as a cap range from 1 to 40, or 3 to 30 or 5 to 25 (based on 100% by weight of the polyol).

In certain embodiments, the polyol is present in the reaction mixture used to produce the macromer in an amount of at least 80%, such as at least 90%, at least 95%, or, in some cases, at least 97.0% by weight and/or up to 99.9%, such as up to 99%, up to 98%, or, in some cases, up to 97.5% by weight, based on the total combined weight of the reactants used to produce the macromer.

As previously indicated, the reaction mixture used to produce the macromers of this specification includes a hydroxyl-reactive compound that contains reactive ethylenic unsaturation. Examples of such compounds which are suitable for use herein, include, for example, methyl methacrylate, ethyl methacrylate, maleic anhydride, isopropenyl dimethyl benzyl isocyanate, 2-isocyanatoethyl methacrylate, adducts of isophorone diisocyanate and 2-hydroxyethyl methacrylate, adducts of toluenediisocyanate and 2-hydroxypropyl acrylate, etc.

In certain embodiments, the hydroxyl-reactive compound that contains reactive ethylenic unsaturation is present in the reaction mixture used to produce the macromer in an amount of at least 0.01%, such as at least 0.1%, or, in some cases, at least 0.5% by weight and/or up to 10%, such as up to 1%, or, in some cases, up to 0.6% by weight, based on the total combined weight of the reactants used to produce the macromer.

In some embodiments, the reaction mixture used to produce the macromer also comprises a diisocyanate. Suitable diisocyanates include various isomers of diphenylmethane diisocyanate and isomeric mixtures of diphenylmethane diisocyanate such as, for example a mixture of 2,4'-diphenylmethane diisocyanate, 4,4'-diphenylmethane diisocyanate and/or 2,2'-diphenyl-methane diisocyanate. In certain embodiments, a mixture of 2,4'-diphenylmethane diisocyanate and of 4,4'-diphenylmethane diisocyanate is suitable. Other suitable isocyanates include toluenediisocyanate, isophoronediisocyanate, hexamethylenediisocyanate, and/or 4,4'-methylenebis(cyclohexyl isocyanate), etc.

In certain embodiments, the diisocyanate is present in the reaction mixture used to produce the macromer in an amount of at least 0.01%, such as at least 0.05%, or, in some cases, at least 0.1% by weight and/or up to 3%, such as up to 2.5%, or, in some cases, up to 1.5% by weight, based on the total combined weight of the reactants used to produce the macromer.

The reaction mixture used to form the macromer may also include a polyurethane catalyst to catalyze the reaction of the polyols with isocyanate groups that may be present as part of the organic particulate as well as any diisocyanates, for example. Representative catalysts include: (a) tertiary amines such as bis(2,2'-dimethylamino)ethyl ether, trimethylamine, triethylamine, N-methylmorpholine, N,N-ethylmorpholine, N,N-dimethylbenzylamine, N,N-dimethylethanolamine, N,N,N',N'-tetramethyl-1,3-butanediamine, pentamethyldipropylenetriamine, triethanolamine, triethylenediamine, pyridine oxide and the like; (b) strong bases such as alkali and alkaline earth metal hydroxides, alkoxides, and phenoxides; (c) acidic metal salts of strong acids such as ferric chloride, stannous chloride antimony trichloride, bismuth nitrate and chloride, and the like; (d) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylaceone-alkylenediimines, salicylaldehydeimine, and the like, with the various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like; (f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones, and 2-(N, N-dialkylamino)alkanols, such as the chelates of titanium obtained by this or equivalent procedures; (g) salts of organic acids with a variety of metals such as alkali metals, alkaline earth metals, Al, Sn, Pb, Mn, Co, Bi, and Cu, including, for example, sodium acetate, potassium laurate, calcium hexanoate, stannous acetate, stannous octoate, stannous oleate, lead octoate, metallic driers such as manganese and cobalt naphthenate, and the like; (h) organometallic derivatives of tetravalent tin, trivalent and pentavalent As, Sb, and Bi, and metal carbonyls of iron and cobalt.

In certain embodiments, the catalyst is present in the reaction mixture used to produce the macromer in an amount of at least 0.01% and up to 1.0% by weight, based on the total weight of the reaction mixture.

Embodiments of the present specification are also directed to preformed stabilizers prepared from the macromers described herein. Such preformed stabilizer may comprise the reaction product of a reaction mixture comprising: (a) a macromer as described in this specification; (b) one or more ethylenically unsaturated monomers; and (c) at least one free radical initiator.

Suitable ethylenically unsaturated monomers for use in preparing the preformed stabilizer include aliphatic conjugated dienes such as butadiene and isoprene; monovinylidene aromatic monomers such as styrene, α-methylstyrene, (t-butyl)styrene, chlorostyrene, cyanostyrene and bromostyrene; α,β-ethylenically unsaturated carboxylic acids and esters thereof, such as acrylic acid, methacrylic acid, methyl methacrylate, ethyl acrylate, 2-hydroxyethyl acrylate, butyl acrylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-dimethylaminomethyl)acryl-amide and the like; vinyl esters, such as vinyl acetate; vinyl ethers, vinyl ketones, vinyl and vinylidene halides, as well as a wide variety of other ethylenically unsaturated materials which are copolymerizable with the aforementioned macromer. It is understood that mixtures of two or more of the aforementioned ethylenically unsaturated monomers are also suitable to be employed in making the pre-formed stabilizer.

It some embodiments, the ethylenically unsaturated monomer used in preparing the preformed stabilizer comprises a mixture of acrylonitrile and at least one other ethylenically unsaturated comonomer which is copolymerizable with acrylonitrile. Illustrations of ethylenically unsaturated comonomers copolymerizable with acrylonitrile include styrene and its derivatives, acrylates, methacrylates such as methyl methacrylate, vinylidene chloride, and the like. In some cases, a mixture of styrene and acrylonitrile is used.

When using acrylonitrile with a comonomer, it is sometimes desirable that a minimum of about 5 to 15 percent by weight acrylonitrile is maintained in the system. Styrene can be used as the comonomer, but methyl methacrylate or other monomers may be employed in place of part or all of the styrene. In some embodiments, where a mixture of styrene and acrylonitrile is used, a weight proportion of acrylonitrile can range, for example, from 20 to 80 weight percent of the comonomer mixture, or from 30 to 70 weight percent, and styrene can accordingly vary from 80 to 20 weight percent, or from 70 to 30 weight percent of the mixture. Acrylonitrile to styrene ratios in the monomer mixture of from 20:80 to 80:20 or 30:70 to 70:30 are sometimes used.

Suitable free radical initiators suitable for use in preparing the preformed stabilizers encompass any free radical catalyst suitable for grafting of an ethylenically unsaturated polymer to a polyether containing compound, such as polyether polyol. Examples of suitable free-radical initiators include, for example, peroxides including both alkyl and aryl hydroperoxides, persulfates, perborates, percarbonates, azo compounds, etc. Some specific examples include catalysts such as hydrogen peroxide, di(t-butyl)-peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxy pivalate, t-amyl peroxy pivalate, t-butyl peroxy-2-ethyl hexanoate, lauroyl peroxide, cumene hydroperoxide, t-butyl hydroperoxide, azobis(isobutyronitrile), and 2,2'-azo bis-(2-methylbutyronitrile), etc.

Also suitable are those having a satisfactory half-life within the temperature ranges used to form the preformed stabilizer, i.e. the half-life should be 25 percent or less of the residence time in the reactor at a given temperature. Representative examples include t-butyl peroxy-2-ethylhexanoate, t-butylperpivalate, t-amyl peroctoate, 2,5-dimethyl-hexane-2,5-di-per-2-ethyl hexoate, t-butylperneodecanoate, and t-butylperbenzoate. Useful also are the azo catalysts, such as azobis-isobutyronitrile, 2,2'-azo bis-(2-methylbutyro-nitrile), and mixtures thereof.

In some embodiments, the reaction mixture used to produce the preformed stabilizer also comprises a polymer control agent. Suitable compounds to be used as polymer control agents include various mono-ols (i.e. monohydroxy alcohols), aromatic hydrocarbons, ethers, and other liquids, such as those described in, for example, U.S. Pat. Nos. 3,953,393, 4,119,586, 4,463,107, 5,324,774, 5,814,699 and 6,624,209, the disclosures of which are herein incorporated by reference. As long as the compound used as the polymer control agent does not adversely affect the performance of the preformed stabilizer, it is suitable. As will be appreciated, a mono-ol is typically an alcohol containing at least one carbon atom, such as methanol, ethanol, n-propanol, isopropanol, n-butanol, sec.-butanol, t-butanol, n-pentanol, 2-pentanol, 3-pentanol, and the like, and mixtures thereof. Other suitable polymer control agents include ethylbenzene and toluene.

Polymer control agents can be used in substantially pure form (i.e. as commercially available) or can be recovered in crude form from the polymer polyol process and reused as-is. For instance, if the polymer control agent is isopropanol, it can be recovered from the polymer polyol process and used at any point in a subsequent product campaign in which the isopropanol is present (i.e. such as the production of preformed stabilizer). The amount of crude polymer control agent in the total polymer control agent can range anywhere from 0% up to 100% by weight.

The reaction mixture to produce the preformed stabilizer may also comprise a diluent, which is often alkylene oxide adduct of as described above with respect to the polyol present in the reaction mixture to form the macromer described herein. Though the polyol can encompass the variety of polyols described above, it is sometimes desirable that the polyol present in the reaction mixture to form the preformed stabilizer is the same as or equivalent to the polyol used in the reaction mixture used to form macromer used to prepare the preformed stabilizer.

In some embodiments, the amount of the components in the reaction mixture used to form the preformed stabilizer, is as follows: (a) 10 to 40 percent by weight, such as 15 to 30 percent by weight, of macromer, based on the total weight of the reaction mixture; (b) 10 to 50 percent by weight, such as 20 to 40 percent by weight, of ethylenically unsaturated monomer, based on the total weight of the reaction mixture; (c) 0.01 to 2 percent by weight, such as 0.1 to 1 percent by weight, of free radical initiator; (d) 30 to 80 percent by weight, such as 40 to 70 percent by weight, of polymer control agent, based on the total weight of the reaction mixture, and (e) 0 to 40 percent by weight, such as 0 to 20 percent by weight or 0 to 10 percent by weight, of diluent, based on the total weight of the reaction mixture.

The process for producing the preformed stabilizer is similar to the process for making the polymer polyol (described below). The temperature range is not critical and may vary from, for example, 80° C. to 150° C., such as 115° C. to 125° C. The mixing conditions employed are typically those obtained using a back mixed reactor (e.g.—a stirred flask or stirred autoclave). The reactors of this type may keep the reaction mixture relatively homogeneous and so prevent localized high monomer to macromer ratios such as may occur in tubular reactors, where all of the monomer is added at the beginning of the reactor. In addition, more efficient mixing can be obtained by the use of an external pump around loop on the reactor section. For instance, a stream of reactor contents may be removed from the reactor bottom via external piping and returned to the top of the reactor (or vice versa) in order to enhance internal mixing of the components. This external loop may contain a heat exchanger if desired.

Embodiments of the present specification are also directed to polymer polyols produced using the preformed stabilizers described herein. In particular, such polymer polyols may comprise the reaction product of a reaction mixture comprising: (1) at least one base polyol; (2) a mixture of ethylenically unsaturated monomers; (3) a preformed stabilizer as described in this specification; and (4) at least one free radical initiator. Certain embodiments of the polymer polyols of the present specification are characterized by a solids content of 30 to 75% by weight and a viscosity at 25° C. of less than 50,000 mPa·s. The viscosity values reported herein refer to the viscosity measured at 25° C. on an Anton Paar SVM3000 viscometer. These polymer polyols, in some embodiments, have a minimum solids content of 30%, of 33%, of 36%, or of 40%, by weight and/or a maximum solids content of 75%, of 70%, of 65%, or of 55% by weight. Polymer polyols of the present specification sometimes have a viscosity (at 25° C.) of less than 50,000 mPa·s, such as less than 30,000, less than 20,000, less than 15,000 or of less than 10,000 mPa·s.

Suitable polyols to be used as the base polyols in the reaction mixture to form the polymer polyol include, for example, polyether polyols. Suitable polyether polyols include those having a hydroxyl functionality of at least 2, or of at least 3. The hydroxyl functionality of suitable polyether polyols is typically less than or equal to 8, or less than or equal to 6. The suitable polyether polyols may also have functionalities ranging between any combination of these upper and lower values, such as from 2 to 8, or of from 2 to 6, or of from 3 to 6. The OH numbers of suitable polyether polyols is often at least 20, at least 25, or, in some cases, at least 30. Suitable polyether polyols typically also have OH numbers of less than or equal to 400, less than or equal to 200, or, in some cases, less than or equal to 150. The suitable polyether polyols may also have OH numbers ranging between any combination of these upper and lower values, inclusive, such as, for example, from at least 20 to less than or equal to 400, or from at least 25 to less than or equal to 200, or from at least 30 to less than or equal to 150.

Specific non-limiting examples of suitable base polyols include polyoxyethylene glycols, triols, tetrols and higher functionality polyols, polyoxypropylene glycols, triols, tetrols and higher functionality polyols, mixtures thereof, etc. When mixtures as used, the ethylene oxide and propylene oxide may be added simultaneously or sequentially to provide internal blocks, terminal blocks or random distribution of the oxyethylene groups and/or oxypropylene groups in the polyether polyol. Suitable starters or initiators for these compounds include, for example, ethylene glycol, propylene glycol, diethylene glycol, dipropylene glycol, tripropylene glycol, trimethylol-propane, glycerol, pentaerythritol, sorbitol, sucrose, ethylenediamine, toluene diamine, etc. By alkoxylation of the starter, a suitable polyether polyol for the base polyol component can be formed. The alkoxylation reaction may be catalyzed using any conventional catalyst including, for example, potassium hydroxide (KOH) or a double metal cyanide (DMC) catalyst.

Other suitable polyols for the base polyol include alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, etc., and alkylene oxide adducts of polyhydroxyalkanes other than those described above.

Illustrative alkylene oxide adducts of polyhydroxyalkanes include, for example, alkylene oxide adducts of 1,3-dihydroxypropane, 1,3-dihydroxybutane, 1,4-dihydroxybutane, 1,4-, 1,5- and 1,6-dihydroxyhexane, 1,2-, 1,3-, 1,4-, 1,6- and 1,8-dihydroxyoctane, 1,10-dihydroxydecane, glycerol, 1,2,4-trihydroxybutane, 1,2,6-trihydroxyhexane, 1,1,1-trimethyl-olethane, 1,1,1-trimethylolpropane, pentaerythritol, caprolactone, polycaprolactone, xylitol, arabitol, sorbitol, mannitol, and the like.

Other polyols which can be employed include the alkylene oxide adducts of non-reducing sugars, wherein the alkoxides have from 2 to 4 carbon atoms. Non-reducing sugars and sugar derivatives include sucrose, alkyl glycosides such as methyl glycoside, ethyl glucoside, etc. glycol glucosides such as ethylene glycol glycoside, propylene glycol glucoside, glycerol glucoside, 1,2,6-hexanetriol glucoside, etc. as well as alkylene oxide adducts of the alkyl glycosides.

Other suitable polyols include the polyphenols and the alkylene oxide adducts thereof wherein the alkylene oxides have from 2 to 4 carbon atoms. Among the polyphenols which are suitable include, for example, bisphenol A, bisphenol F, condensation products of phenol and formaldehyde, the novolac resins, condensation products of various phenolic compounds and acrolein, including the 1,1,3-tris (hydroxy-phenyl)propanes, condensation products of various phenolic compounds and glyoxal, glutaraldehyde, other dialdehydes, including the 1,1,2,2-tetrakis(hydroxyphenol) ethanes, etc.

The alkylene oxide adducts of phosphorus and polyphosphorus acid are also useful polyols. These include ethylene oxide, 1,2-epoxy-propane, the epoxybutanes, 3-chloro-1,2-epoxypropane, etc. Phosphoric acid, phosphorus acid, the polyphosphoric acids, such as, tripolyphosphoric acid, the polymetaphosphoric acids, etc. are suitable for use herein.

It should also be appreciated that blends or mixtures of various useful polyols may be used if desired.

Suitable compounds to be used as the ethylenically unsaturated monomers in the reaction mixture used to prepare the polymer polyol include, for example, those ethylenically unsaturated monomers described above with respect to the preformed stabilizer. In some cases, the monovinylidene aromatic monomers, such as styrene, and the ethylenically unsaturated nitriles, such as acrylonitrile, are used. In some embodiments, the ethylenically unsaturated monomers include styrene and its derivatives, acrylonitrile, methyl acrylate, methyl methacrylate, vinylidene chloride or a combination of two or more thereof, such as a combination of styrene and acrylonitrile.

It some embodiments, styrene and acrylonitrile are used in sufficient amounts such that the weight ratio of styrene to acrylonitrile (S:AN) is from 80:20 to 20:80, such as 75:25 to 25:75.

In some embodiments, the polymer solids content that is present in the polymer polyols is at least 30% by weight, at least 35% by weight, or at least 40% by weight and less than or equal to 75% by weight, less than or equal to 70% by weight, or less than or equal to 55% by weight, based on the total weight of the polymer polyol.

Suitable free-radical initiators for use in the reaction mixture to produce the polymer polyol include, for example, those as described previously for the formation of the preformed stabilizers. The quantity of free-radical initiator used herein is not critical and can be varied within wide limits. In general, the amount of initiator ranges from about 0.01 to 2% by weight, based on the total weight of the final polymer polyol.

In addition, the reaction mixture used to produce the polymer polyol may comprise a chain transfer agent. Examples of suitable chain transfer agents include compounds such as mercaptans including, e.g. dodecane thiol, ethane thiol, octane thiol, toluene thiol, etc., halogenated hydrocarbons such as, e.g. carbon tetrachloride, carbon tetrabromide, chloroform, etc., amines such as diethylamine, enol-ethers, etc. If used at all, a chain transfer agent is typically used in an amount of from 0.1 to 2% by weight, such as 0.2 to 1% by weight, based on the total weight of the polymer polyol (prior to stripping).

The polymer polyols can be made using any process (including continuous and semi-batch) and reactor configuration that is known to be suitable to prepare polymer polyols, such as, for example, a two-stage reaction system comprising a continuously-stirred tank reactor (CSTR) fitted with impeller(s) and baffles (first-stage) and a plug-flow reactor (second stage). A typical reaction system may be equipped with any combination of jacket/half-coil, internal coil/tubes or external loop/cooler to remove the heat of reaction. Furthermore, the reaction system can utilize a wide range of mixing conditions. The reaction system may be characterized by energy inputs of from 0.5 to 350 horsepower per 1000 gallons, with mixing energies of from 2 to 50 horsepower per 1000 gallons on average for the bulk phase volume of each reactor, for example. Mixing can be provided by any combination of impeller(s) and pump-around loop/jet mixing. It will be appreciated by one of ordinary skill in the art that the optimum energy input will most likely vary with the dispersion stability and the molecular weight of the base polyol, e.g., a greater amount of energy is preferred for products with higher viscosities. In addition, the polymer polyols of the present specification can be prepared from various types and combinations of axially and/or radially/tangentially acting impellers including, but not limited to, 4-pitched-blade, 6-pitched-blade, 4-flat-blade, 6-flat-blade, pitched-blade turbine, flat-blade turbine, Rushton, Maxflow, propeller, etc. For a continuous production process to prepare polymer polyols including those described herein, a residence time ranging from about 20 to about 180 minutes for the first reactor may be particularly useful. It is understood that for a multistage reactor system, total residence time is additive based on number of reactors.

The reactants may be pumped from feed tanks through an in-line static mixer, and then, through a feed tube into the reactor. It may be useful to prepare a premix of the initiator with part of the polyol stream, as well as of polyol and stabilizer. Feed stream temperatures are sometimes ambient (i.e. 25° C.). However, if desired, feed streams can be heated to greater than 25° C. prior to mixing and entering the reactor. Other process conditions which may be useful include cooling of the feed tube in the reactor. Furthermore, the suitable reaction conditions for polymer polyols can be, for example, characterized by a reaction temperature in the range of 80 to 200° C. and a pressure in the range of 20 to 80 psig. Typically, the product can then treated in a single or multi staged stripping step to remove volatiles before entering a stage, which can essentially be any combination of filtration and/or product cooling. In the present case, the wt.-% total polymer in the product was calculated from the concentrations of monomers measured in the crude polymer polyol before stripping.

In some cases, the polymer polyol is produced by utilizing a low monomer to polyol ratio which is maintained throughout the reaction mixture during the process. This can be achieved by employing conditions that provide rapid conversion of monomer to polymer. In practice, a low monomer to polyol ratio can be maintained, in the case of semi-batch and continuous operation, by control of the temperature and mixing conditions and, in the case of semibatch operation, also by slowly adding the monomers to the polyol.

A suitable continuous process for making polymer polyols comprises (1) providing a heterogeneous mixture of the preformed stabilizer and, optionally, liquid diluent, in combination with a polyol, a free radically polymerizable ethylenically unsaturated monomer, and a free radical polymerization initiator, and (2) maintaining the mixture in a reaction zone (the reaction zone being maintained at a temperature sufficient to initiate a free radical reaction, and under sufficient pressure to maintain only liquid phases in the reaction zone) for a period of time sufficient to react at least a major portion of the ethylenically unsaturated monomer to form a heterogenous mixture containing the enhanced polymer polyol, unreacted monomers and diluent, and (3) stripping the unreacted monomers and diluent from the enhanced polymer polyol to recover the unreacted monomers and diluent.

The mixing conditions employed can be those obtained using a back mixed reactor (e.g.—a stirred flask or stirred autoclave). The reactors of this type keep the reaction mixture relatively homogeneous and so prevent localized high monomer to polyol ratios such as occur in tubular reactors when such reactors are operated with all the monomer added to the beginning of the reactor.

The polymer polyols of the present specification comprise dispersions in which the polymer particles (the same being either individual particles or agglomerates of individual particles) are relatively small in size and, in the preferred embodiment, have a weight average size less than about ten microns. However, when high contents of styrene are used, the particles may tend to be larger.

Following polymerization, volatile constituents are typically stripped from the product by, for example, the usual method of vacuum distillation, optionally in a thin layer of a falling film evaporator. The monomer-free product may be used as is, or may be filtered to remove any large particles that may have been created. In some embodiments, all of the product (viz. 100%) will pass through the filter employed in the 150 mesh filtration hindrance (i.e. filterability) test.

In some embodiments, the polymer polyol may be combined with at least one isocyanate-reactive component that acts to reduce the total solids content in the polymer polyol. Suitable compounds to be used as such an isocyanate-reactive component include those which have a hydroxyl functionality of from 1 to 8 and a hydroxyl number of from 20 to 400. These compounds may also have a hydroxyl functionality of at least about 2, or at least about 3. In addition, the suitable compounds may have a hydroxyl functionality of about 7 or less, or of about 6 or less. Suitable compounds may also be characterized by a hydroxyl number of at least 20, or of at least 25 or of at least 30. These may also have a hydroxyl number of 400 or less, or of 200 or less; or of 150 or less.

Examples of suitable compounds to be used as the foregoing isocyanate-reactive component include polyether polyols, polyester polyols, polyether carbonate polyols, etc. Also suitable are relatively low molecular weight compounds based on a functionality of 1 and an OH # of 400 (MW=140). Other suitable compounds include, for example, polyoxyalkylene polyols, polyester polyols, polythioethers, polyacetals, polycarbonates, polyethercarbonate polyols, etc. Lower molecular weight isocyanate-reactive components such as crosslinkers and/or chain extenders may also be present.

The present specification is also directed to polyurethane foams, such as flexible polyurethane foams, prepared from the polymer polyols described herein. These foams comprise the reaction product of a polyisocyanate component, with an isocyanate-reactive component that comprises the polymer polyols described herein, in the presence of one or more catalysts, one or more blowing agents, and optionally, one or more surfactants. In addition, the isocyanate-reactive component may additionally comprise one or more crosslinking agents, one or more chain extenders, and/or one or more polyether polyols containing a high ethylene oxide content. It is also possible that the isocyanate-reactive component additionally comprises one or more polyoxyalkylene polyols, polyether polyols, polyester polyols, polycarbonate ether polyols, polythioethers, polycarbonates, polyacetals, etc., and mixtures thereof. Various additives and/or auxiliary agents which are known to be useful in preparing foams may also be present.

Suitable polyisocyanates for the polyisocyanate component comprise those known in the art, to be suitable for the preparation of polyurethane foams. The polyisocyanates may be di- or poly-functional, and include, for example, (cyclo)aliphatic di- and/or polyisocyanates, aromatic di- and/or polyisocyanates, and araliphatic di- and/or polyisocyanates. Some specific examples of suitable aromatic polyisocyanates and aromatic diisocyanates include compounds such as toluene diisocyanate, diphenylmethane diisocyanate, polymethylene polyphenyl polyisocyanate, etc., and mixtures or blends thereof.

In some cases, the polyisocyanate component comprises: (1) from 10 to 90 wt. % of one or more isomer of toluene diisocyanate and (2) from 90 to 10 wt. % of polymethylene polyphenylisocyanate and/or one or more isomers of diphenylmethane diisocyanate, with the sum of the wt. %'s totaling 100 wt. % of the polyisocyanate component; (1) 70 to 90 wt. % of one or more isomers of diphenylmethane diisocyanate, and (2) 10 to 30 wt. % of one or more isomers of toluene diisocyanate, with the sum of the wt. %'s totaling 100 wt. % of the polyisocyanate component; and (1) 70 to 90 wt. % of one or more isomers of toluene diisocyanate, and (2) 30 to 10 wt. % of polymethylene polyphenylisocyanate, with the sum of the wt. %;s totaling 100 wt. % of the polyisocyanate component.

Suitable compounds to be used as the isocyanate-reactive component include the polymer polyols described herein. The isocyanate-reactive component may additionally comprise a conventional (i.e. non-solids containing) isocyanate-reactive component such as, for example, a polyoxyalkylene polyol, a polyether polyol, a polyester polyol, a polythioether, a polyacetal, a polycarbonate, a polycarbonate ether polyol, etc., and mixtures thereof. These isocyanate-reactive compounds typically have a hydroxyl functionality of from 2 to 8, or from 2 to 6, or from 2 to 4, and a molecular weight of from 1000 to 12,000, or from 1000 to 8,000, or from 2000 to 6000. In addition, lower molecular weight isocyanate-reactive components such as crosslinkers and/or chain extenders may be used. These lower molecular weight isocyanate-reactive components include chain extenders which may have functionalities of 2 and molecular weights ranging from 61 to 500; and cross linking agents which may have functionalities of 3 to 4 and molecular weights ranging from 92 to less than 1000, or from 92 to less than or equal to 750. Examples of suitable chain extenders include ethylene glycol, 2-methyl-1,3-propanediol, 1,2- and 1,3-propanediol, 1,3- and 1,4- and 2,3-butanediol, 1,6-hexanediol, diethylene glycol, triethylene glycol, dipropylene glycol, etc., and mixtures thereof, and alkylene oxide adducts thereof. Some examples of suitable crosslinking agents include glycerol, trimethylolpropane, pentaerythritol, diethanolamine, triethanolamine, etc., mixtures thereof, and alkylene oxide adducts thereof. It is also possible to use a polyether polyol that contains a high ethylene oxide content.

At least one polyurethane catalyst is usually required to catalyze the reactions of the monol, polyols and water with the polyisocyanate. It is common to use both an organoamine and an organotin compound for this purpose. Suitable polyurethane catalysts are organotin catalysts, including tin salts and dialkyltin salts of carboxylic acids, such as stannous octoate, dibutyltin dilaurate, dibutyltin diacetate, stannous oleate, and the like. Suitable organoamine catalysts are tertiary amines such as trimethylamine, triethylamine, triethylenediamine, bis(2,2'-dimethylamino)ethyl ether, N-ethylmorpholine, diethylenetriamine, and the like.

The polyurethane catalysts are typically used in an amount within the range of 0.05 to 3 parts, such as 0.1 to 2 parts, per 100 parts of isocyanate-reactive mixture.

Suitable blowing agents include, for example chemical blowing agents and/or physical blowing agents. Some examples of the suitable blowing agents include water, formic acid, carbon dioxide, chlorofluorocarbons, highly fluorinated and/or perfluorinated hydrocarbons, chlorinated hydrocarbons, halogenated hydroolefins, aliphatic and/or cycloaliphatic hydrocarbons, such as propane, butane, pentane, hexane, etc., or acetals, such as methylal, etc. It is of course possible to use a mixture of blowing agents. When using a physical blowing agent, this is typically added to the isocyanate-reactive component of the system. These can, however, also be added in the polyisocyanate component or to a combination of both the isocyanate-reactive component and to the polyisocyanate component. Blowing agents may also be used in the form of an emulsion of the isocyanate-reactive component. Combinations of water and one or more auxiliary blowing agents are also suitable herein, In addition, water may be used as the sole blowing agent.

The amount of blowing agent or blowing agent mixture used is from 0.5 to 20%, such as from 0.75 to 10% by weight, based in each case on the total weight of the isocyanate-reactive component. When water is the blowing agent, it is often present in an amount of from 0.5 to 10%, such as from 0.75 to 7% by weight, based on the total weight of the isocyanate-reactive component.

Surfactants are sometimes used to prepare the foams. Surfactants are known help to stabilize the foam until it cures. Suitable surfactants include organosilicone surfactants, such as DC-5043, DC-5164 and DC-5169, as well as Niax L-620, a product of Momentive Performance Materials, and Tegostab B8244, a product of Evonik-Goldschmidt. The surfactant is typically used in an amount within the range of 0.1 to 4, such as 0.2 to 3, parts per 100 parts of isocyanate-reactive mixture.

Other optional components that may be present in the foam formulations include, for example, flame retardants, antioxidants, pigments, dyes, liquid and solid fillers, etc. Such commercial additives are included in the foams in conventional amounts when used.

The foams can be prepared using methods that are well known in the industry. These methods may include continuous or discontinuous free-rise slabstock foam processes and molded foam processes. In a typical slabstock process, the isocyanate is continuously mixed together with the other formulation chemicals by passing through a mixing head and then into a trough which overflows onto a moving conveyor. Alternatively, the reacting mixture is deposited directly onto the moving conveyor. In another embodiment, high pressure liquid carbon dioxide is fed into one or more of the formulation components, typically the polyol, entering into the mixing head and the resin blend is passed through a frothing device where the pressure is let down and the resultant froth is deposited onto the conveyor. The foam expands and rises as it moves down the conveyor to form a continuous foam slab that is cut into blocks or buns of the desired length for curing and storage. After curing for one or more days, these foam buns can be cut into the desired shapes for the end-use applications. In the discontinuous process, the reactants are quickly mixed together through a head or in a large mixing chamber. The reaction mixture is then deposited into a large box or other suitable container where foam expansion occurs to form a bun of the lateral dimensions of the container.

A typical molded foam process usually employs a one-shot approach in which a specific amount of the isocyanate stream (the "A" side) is rapidly combined and mixed with a specific amount of the remaining formulation components (the "B" side). An additional stream may be employed to bring in one or more specific components not included with the "B" side stream. The mixture is quickly deposited into a mold that is then closed. The foam expands to fill the mold and produce a part with the shape and dimensions of the mold.

In accordance with some embodiments of the foams of the present specification, the foams are prepared at isocyanate indices ranges from 70 to 130, or from 80 to 120 or from 90 to 110. The term "isocyanate index", which may also be referred to as the NCO index, is defined herein as the ratio of reactive isocyanate groups (equivalents) to active hydrogen groups (equivalents), multiplied by 100%.

A prepolymer approach to making the foams can also be used. In this approach, a significant portion of the isocyanate-reactive mixture is reacted with the polyisocyanate, and the resulting prepolymer is then reacted with the remaining components.

It has been discovered that, by adding an isocyanate residue to the macromer, certain properties, such as viscosity, filterability, particle size, of the resultant polymer polyols may be improved or at least not detrimentally affected. Thus, it is currently believed that the macromers of the present specification provide an opportunity for effective utilization of a residue of isocyanate manufacturing that may otherwise be a waste material.

Various aspects of the subject matter described herein are set out in the following numbered clauses:

Clause 1. An ethylenically unsaturated macromer comprising the reaction product of a reaction mixture comprising: (a) an isocyanate residue; (b) a polyol having a hydroxyl number of 20 to 75 and a hydroxyl functionality of 2 to 8; and (c) a hydroxyl-reactive compound containing reactive ethylenic unsaturation.

Clause 2. The macromer of clause 1, wherein the isocyanate residue is an organic particulate that has a content of bound isocyanate that is 0.1 to 10% by weight, based on the total weight of the organic particulate.

Clause 3. The macromer of clause 1 or clause 2, wherein the isocyanate residue is a phosgenation product of toluene diamine containing less than 0.5% by weight of ortho-toluenediamine isomers, based on the total weight of toluene diamine.

Clause 4. The macromer of one of clause 1 to clause 3, wherein the isocyanate residue is an organic particulate comprising: (i) a crosslinked polymer comprising aromatic groups, biuret groups, urea groups, and carbodiimide groups; and (ii) a high-boiling hydrocarbon.

Clause 5. The macromer of clause 4, wherein the organic particulate is a product of a process for the production of a distilled aromatic polyisocyanate by (1) the reaction of the corresponding amine with phosgene in a suitable solvent and multi-stage distillative work-up of the isocyanate solution obtained, and (2) continuously feeding the residue obtained from the distillation process and from 2 to 50 weight % of a high-boiling hydrocarbon which is inert under the distillation conditions to a heated, product-agitating vacuum drier with a horizontal shaft.

Clause 6. The macromer of clause 4 or clause 5, wherein the organic particulate is a residue from synthesis of 2,6-toluene diisocyanate and/or 2,4-toluene diisocyanate.

Clause 7. The macromer of one of clause 4 to clause 6, wherein the organic particulate is present in the reaction mixture in an amount of at least 1% and up to 4% by weight, based on the total combined weight of reactants used to produce the macromer.

Clause 8. The macromer of one of clause 1 to clause 7, wherein the polyol comprises a polyether polyol that is a reaction product of sorbitol and an alkylene oxide comprising propylene oxide and ethylene oxide, wherein the ethylene oxide comprises from 1 to 40% by weight, based on the total weight of the polyol.

Clause 9. The macromer of one of clause 1 to clause 8, wherein the hydroxyl-reactive compound that contains reactive ethylenic unsaturation comprises isopropenyl dimethyl benzyl isocyanate.

Clause 10. The macromer of one of clause 1 to clause 9, wherein the reaction mixture further comprises a diisocyanate.

Clause 11. A preformed stabilizer comprising a reaction product of a reaction mixture comprising: (a) the macromer of one of clause 1 to clause 10; (b) an ethylenically unsaturated monomer; and (c) a free radical initiator.

Clause 12. The preformed stabilizer of clause 11, wherein the ethylenically unsaturated monomer comprises a mixture of acrylonitrile and at least one other ethylenically unsaturated comonomer which is copolymerizable with acrylonitrile.

Clause 13. The preformed stabilizer of clause 11 or clause 12, wherein the mixture comprises styrene and acrylonitrile.

Clause 14. The preformed stabilizer of one of clause 11 to clause 13, wherein the reaction mixture further comprises: (d) a polymer control agent; and/or (e) a diluent.

Clause 15. A polymer polyol comprising a reaction product of a reaction mixture comprising: (1) a base polyether polyol having a hydroxyl functionality of 2 to 8 and an OH number of 20 to 400; (2) a mixture of ethylenically unsaturated monomers comprising styrene and acrylonitrile in amounts such that the weight ratio of styrene to acrylonitrile is from 80:20 to 20:80; (3) the preformed stabilizer of one of clause 11 to clause 14; (4) at least one free radical initiator and, optionally (5) a polymer control agent.

Clause 16. A polyurethane foam comprising a reaction product of a polyisocyanate component with an isocyanate-reactive component that comprises the polymer polyols of clause 15.

Clause 17. An ethylenically unsaturated macromer comprising the reaction product of a reaction mixture comprising: (a) an organic particulate comprising: (i) a crosslinked polymer comprising aromatic groups, biuret groups, urea groups, and carbodiimide groups; and (ii) a high-boiling hydrocarbon isocyanate residue; (b) a polyol having a hydroxyl number of 20 to 75 and a hydroxyl functionality of 2 to 8; and (c) a hydroxyl-reactive compound containing reactive ethylenic unsaturation.

Clause 18. The macromer of clause 17, wherein the organic particulate that has a content of bound isocyanate that is 0.1 to 10% by weight, based on the total weight of the organic particulate.

Clause 19. The macromer of clause 18, wherein the organic particulate is an isocyanate residue that is a phosgenation product of toluene diamine containing less than 0.5% by weight of ortho-toluenediamine isomers, based on the total weight of toluene diamine.

Clause 20. The macromer of one of clause 17 to clause 19, wherein the organic particulate is a residue from synthesis of 2,6-toluene diisocyanate and/or 2,4-toluene diisocyanate.

Clause 21. The macromer of one of clause 17 to clause 20, wherein the organic particulate is present in the reaction mixture in an amount of at least 1% and up to 4% by weight, based on the total combined weight of reactants used to produce the macromer.

Clause 22. The macromer of one of clause 17 to clause 21, wherein the polyol comprises a polyether polyol that is a reaction product of sorbitol and an alkylene oxide comprising propylene oxide and ethylene oxide, wherein the ethylene oxide comprises from 1 to 40% by weight, based on the total weight of the polyol.

Clause 23. The macromer of one of clause 17 to clause 20, wherein the reaction mixture further comprises a diisocyanate.

Clause 24. A preformed stabilizer comprising a reaction product of a reaction mixture comprising: (a) the macromer of one of clause 17 to clause 23; (b) an ethylenically unsaturated monomer comprising a mixture of styrene and acrylonitrile; and (c) a free radical initiator.

Clause 25. The preformed stabilizer of clause 24, wherein the reaction mixture further comprises: (d) a polymer control agent; and/or (e) a diluent.

Clause 26. A polymer polyol comprising a reaction product of a reaction mixture comprising: (1) a base polyether polyol having a hydroxyl functionality of 2 to 8 and an OH number of 20 to 400; (2) a mixture of ethylenically unsaturated monomers comprising styrene and acrylonitrile in amounts such that the weight ratio of styrene to acrylonitrile is from 80:20 to 20:80; (3) the preformed stabilizer of clause 25; and (4) at least one free radical initiator.

Clause 27. A polyurethane foam comprising a reaction product of a polyisocyanate component with an isocyanate-reactive component that comprises the polymer polyol of clause 26.

EXAMPLES

The following components were used in the examples.

Polyol 1: A propylene oxide adduct of sorbitol containing 12% ethylene oxide as a cap with a hydroxyl number of 33.

Polyol 2: A propylene oxide adduct of glycerine containing 12% ethylene oxide with a hydroxyl number of 52 and having a viscosity of 520 mPa·s Polyol 3: A propylene oxide adduct of glycerine containing a 20% ethylene oxide cap with a hydroxyl number of 36 and having a viscosity of 833 mPa·s Polyol 4: A glycerin/sorbitol started polyether polyol containing about 81 to 82% of propylene oxide and about 17 to 18% of ethylene oxide, having an OH number of about 31.5 and a viscosity of 1100 mPa·s PCA: Isopropanol, a polymer control agent MDI: Monomeric diphenylmethane diisocyanate (MDI) containing a high 2,4'-isomer content, available as Mondur® MLQ from Covestro LLC TMI: Isopropenyl dimethyl benzyl isocyanate (an unsaturated aliphatic isocyanate) sold as TMI® by Allnex TDI: toluene diisocyanate comprising 80% by weight of the 2,4-isomer and 20% by weight of the 2,6-isomer, and having an NCO group content of 48.3%

Residue-1: Solid toluene diisocyanate residue particles comprising: (i) a crosslinked polymer comprising aromatic groups, biuret groups, urea groups, and carbodiimide groups; and (ii) a high-boiling hydrocarbon, prepared according to the process described in U.S. Pat. No. 5,446,196. The particles were processed in an attrition mill to give a fine powder with a mean particle size of 2 microns as determined by laser diffraction analyzer methods.

Initiator A: tertiary-Butylperoxy-2-ethylhexanoate available as TBPEH from United initiators Initiator B: tertiary-Amyl peroxypivalate, a free-radical polymerization initiator commercially available as Trigonox 125-C75 from Nouryon.

Initiator C: 2,2'-Azobisisobutyronitrile, a free-radical polymerization initiator commercially available as VAZO 64 from E.I. Du Pont de Nemours and Co.

DEOA-LF: diethanolamine, a commercially available foam crosslinker/foam modifier that is commercially available from Air Products Catalyst A: Bismuth neodecanoate, commercially available under the name CosCat 83 from Vertellus Catalyst B: 70% by weight bis[2-dimethylaminoethyl]ether in 30% dipropylene glycol, an amine catalyst, commercially available from Momentive Performance Materials as NIAX A-1

Catalyst C: 33% by weight diazabicyclooctane in 67% by weight dipropylene glycol, an amine catalyst, commercially available from Momentive Performance Materials as NIAX A-33

Surfactant A: a silicon surfactant commercially available as DC5043 from Air Products Viscosity: Dynamic viscosities reported in mPa·s and measured on an Anton-Paar SVM 3000 viscometer at 25° C. that has been demonstrated to give equivalent results as can be generated with ASTM-D4878-15. The instrument was calibrated using mineral oil reference standards of known viscosity.

Filtration: Filterability was determined by diluting one part by weight sample (e.g. 200 grams) of polymer polyol with two parts by weight anhydrous isopropanol (e.g. 400 grams) to remove any viscosity-imposed limitations and using a fixed quantity of material relative to a fixed cross-sectional area of screen (e.g. 1⅛ in. diameter), such that all of the polymer polyol and isopropanol solutions passes by gravity through a 700-mesh screen. The 700-mesh screen is made with a Dutch twill weave. The actual screen used had a nominal opening of 30 microns. The amount of sample which passed through the screen within 600 seconds was reported in percent, and a value of 100 percent indicates that over 99 weight percent passed through the screen.

Macromer Preparation:

Macromer A: Prepared by heating Polyol 1 (3000 g) with TMI (61 g) and Catalyst A (200 ppm) at 75° C. for 2 hours.

Macromer B: Polyol 1 (2700 g) and Residue 1 (56 g) were added to a 12 L flask, along with 300 ppm of Catalyst A. The mixture was heated at 100° C. for 4 hours and cooled to 75° C., before adding TMI (61 g) and additional Catalyst A (100 ppm). This reaction mixture was stirred at 75° C. for 2 hours.

Macromer C: Polyol 1 (2783 g), TMI (16.9 g), and MDI (5.6 g) were added to a 12 L flask and stirred at 75° C. for 2 hours. Catalyst A (100 ppm) was added and the reaction mixture was stirred an additional 2 hours at 75° C.

Macromer D: Polyol 1 (2700 g) and Residue 1 (55.6 g) were added to a 12 L flask, along with 300 ppm of Catalyst A. The mixture was heated at 100° C. for 4 hours and cooled to 45° C. MDI was added and the reaction mixture stirred for 1 hour at 75° C. before adding TMI (16.7 g) and Catalyst A (100 ppm). Stirring was stopped after an additional 2 hours at 75° C.

Preformed Stabilizer (PFS) Preparation:

The pre-formed stabilizer was prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously to the reactor from feed tanks through an in-line static mixer and then through a feed tube into the reactor, which was well mixed. The temperature of the reaction mixture was controlled at 120±5° C. The product from the second-stage reactor overflowed continuously through a pressure regulator designed to control the pressure in each stage at 65 psig. The product, i.e. the pre-formed stabilizer, then passed through a cooler and into a collection vessel. The preformed stabilizer formulation is disclosed in Table 1 for PFS A (Macromer A), PFS B (Macromer B), PFS C (Macromer C), and PFS D (Macromer D).

TABLE 1

| Preformed Stabilizer Composition | |
|---|---|
| Component | PFS |
| PCA type | Isopropanol |
| PCA, wt. % | 60.0% |
| Macromer, wt. % | 24.0% |
| Monomer, wt. % | 15.9% |
| Styrene/acrylonitrile ratio | 50:50 |
| TBPEH, wt. % | 0.1% |

Polymer Polyol Preparation:

Table 2 relates to the preparation of the polymer polyol of the present specification. The polymer polyol was prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously from feed tanks through an in-line static mixer and then through a feed tube into the reactor, which was well mixed. The temperature of the reaction mixture was controlled at 120±5° C. The product from the second-stage reactor overflowed continuously through a pressure regulator designed to control the pressure in each stage at 45 psig. The product, i.e. the polymer polyol, then passed through a cooler and into a collection vessel. The crude product was vacuum stripped to remove volatiles. The wt. % total polymer in the product was calculated from the concentrations of residual monomers measured in the crude polymer polyol before stripping.

TABLE 2

| Formulations for Polymer Polyol | | | | |
|---|---|---|---|---|
| | Comp Example 1 | Example 1 | Comp Example 2 | Example 2 |
| Polyol | 2 | 2 | 3 | 3 |
| Polyol (wt. % in feed) | 46.0 | 46.0 | 49.3 | 49.3 |
| PFS | A | B | C | D |
| PFS (wt. % in feed) | 6.9 | 6.9 | 8.3 | 8.3 |
| Styrene (wt. % in feed) | 30.2 | 30.2 | 26.6 | 26.6 |
| Acrylonitrile (wt. % in feed) | 16.2 | 16.2 | 15.4 | 15.4 |
| Initiator | B | B | B | B |
| Initiator (wt. % in feed)* | 0.19 | 0.19 | 0.19 | 0.19 |
| PCA (wt % in feed) | 4.5 | 4.5 | 5.0 | 5.0 |
| Total Polymer (wt. %) | 49.1 | 49.0 | 44.9 | 44.9 |
| Viscosity mPa · s @ 25° C. | 4536 | 4431 | 6016 | 5725 |
| Filterability - 700 mesh (seconds) | 224 | 179 | 244 | 218 |
| Mean particle size (microns) | 0.90 | 0.86 | 1.00 | 0.97 |

*active peroxide, not initiator solution

As can be seen from the examples in Table 2, the use of a macromer containing Residue-1 improved PMPO properties (lower viscosity, faster filterability, smaller particle size) relative to the comparative examples.

Foam formulations were prepared using the components and amounts listed in Table 3. The foams in Table 3 were prepared by mixing, the surfactant, water, catalysts, and diethanolamine in a flask to create a master blend. Then, the desired amount of polyether polyol and polymer polyol was added to a cup containing the desired amount of master blend. The contents of the cup were mixed for 55 seconds. An amount of Isocyanate component necessary to give an isocyanate index of 100 was added to the cup containing the master blend and polyol/polymer polyol mixture. The contents of the cup were mixed together for 5 seconds, and the reacting mixture was quickly poured into a 150° F. water-jacketed mold. After 4.5 minutes, the foam was removed from the mold, run through a cell-opening crushing device, and then placed in a 250° F. oven for 30 minutes to post cure. After 24 hours of aging in a controlled temperature and humidity laboratory, the foams were submitted for physical property testing. Measured properties are set forth in Table 3.

TABLE 3

|  | Foam 1 | Foam 2 |
|---|---|---|
| PMPO type | Comp Example 3[1] | Example 3[2] |
| Polyol 4, pphp | 46.5 | 46.5 |
| PMPO, pphp | 53.5 | 53.5 |
| Water, pphp | 4.1 | 4.1 |
| DEOA-LF, pphp | 1.38 | 1.38 |
| Surfactant A, pphp | 1.0 | 1.0 |
| Catalyst C, pphp | 0.32 | 0.32 |
| Catalyst B, pphp | 0.1 | 0.1 |
| TDI, pphp | 39.57 | 39.56 |
| Physical Properties |  |  |
| IFD 25% | 247 | 256 |
| IFD 50% | 438 | 452 |
| % Settle | 7.4 | 7.5 |

[1]Made according to procedure of Comp Example 2 using 0.29% Initiator C in total feed instead of Initiator B
[2]Made using procedure of Example 2 using 0.29% Initiator C in total feed instead of Initiator B As is apparent, Inventive Foam 2 exhibited about a 3% improvement in IFD properties with respect to the Comparative Foam 1. At the same time, foam stability (% Settle) was unaffected, indicating no negative effects from adding the TDI-residue solids to the PMPO process.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polymer polyol comprising a reaction product of a reaction mixture comprising:
   (1) a base polyether polyol having a hydroxyl functionality of 2 to 8 and an OH number of 20 to 400;
   (2) a mixture of ethylenically unsaturated monomers comprising styrene and acrylonitrile in amounts such that the weight ratio of styrene to acrylonitrile is from 80:20 to 20:80;
   (3) a preformed stabilizer; and
   (4) a free radical initiator,
   wherein the preformed stabilizer comprises a reaction product of a reaction mixture comprising:
      (a) an ethylenically unsaturated macromer;
      (b) an ethylenically unsaturated monomer; and
      (c) a free radical initiator, and
   wherein the ethylenically unsaturated macromer comprises a reaction product of a reaction mixture comprising:
      (a) an isocyanate residue that is an organic particulate having a content of bound isocyanate that is 0.1 to 10% by weight, based on the total weight of the organic particulate;
      (b) a polyol having a hydroxyl number of 20 to 75 and a hydroxyl functionality of 2 to 8; and
      (c) a hydroxyl-reactive compound containing reactive ethylenic unsaturation.

2. The polymer polyol of claim 1, wherein the isocyanate residue is a phosgenation product of toluene diamine containing less than 0.5% by weight of ortho-toluenediamine isomers, based on the total weight of toluene diamine.

3. The polymer polyol of claim 1, wherein the organic particulate is a residue from synthesis of 2,6-toluene diisocyanate and/or 2,4-toluene diisocyanate.

4. The polymer polyol of claim 1, wherein the organic particulate is present in an amount of at least 1% and up to 4% by weight, based on the total combined weight of reactants used to produce the macromer.

5. The polymer polyol of claim 1, wherein the hydroxyl-reactive compound that contains reactive ethylenic unsaturation comprises isopropenyl dimethyl benzyl isocyanate and the reaction mixture used to produce the macromere further comprises a diisocyanate.

6. A method comprising reacting a polyisocyanate with an isocyanate-reactive component comprising the polymer polyol of claim 1, wherein the reaction occurs in the presence of a blowing agent.

7. A polymer polyol comprising a reaction product of a reaction mixture comprising:
   (1) a base polyether polyol having a hydroxyl functionality of 2 to 8 and an OH number of 20 to 400;
   (2) a mixture of ethylenically unsaturated monomers comprising styrene and acrylonitrile in amounts such that the weight ratio of styrene to acrylonitrile is from 80:20 to 20:80;
   (3) a preformed stabilizer; and
   (4) a free radical initiator,
   wherein the preformed stabilizer comprises a reaction product of a reaction mixture comprising:
      (a) an ethylenically unsaturated macromer;
      (b) an ethylenically unsaturated monomer; and
      (c) a free radical initiator, and
   wherein the ethylenically unsaturated macromer comprises a reaction product of a reaction mixture comprising:
      (a) an organic particulate comprising:
         (i) a crosslinked polymer comprising aromatic groups, biuret groups, urea groups, and carbodiimide groups; and
         (ii) a high-boiling hydrocarbon;
      (b) a polyol having a hydroxyl number of 20 to 75 and a hydroxyl functionality of 2 to 8; and
      (c) a hydroxyl-reactive compound containing reactive ethylenic unsaturation.

8. The polymer polyol of claim 7, wherein the organic particulate is a residue from synthesis of 2,6-toluene diisocyanate and/or 2,4-toluene diisocyanate.

9. The polymer polyol of claim 7, wherein the organic particulate is present in the reaction mixture in an amount of at least 1% and up to 4% by weight, based on the total combined weight of reactants used to produce the macromer.

10. The polymer polyol of claim 7, wherein the hydroxyl-reactive compound that contains reactive ethylenic unsaturation comprises isopropenyl dimethyl benzyl isocyanate and the reaction mixture used to produce the macromere further comprises a diisocyanate.

11. A method comprising reacting a polyisocyanate with an isocyanate-reactive component comprising the polymer polyol of claim 7, wherein the reaction occurs in the presence of a blowing agent.

12. A polymer polyol comprising a reaction product of a reaction mixture comprising:
   (1) a base polyether polyol having a hydroxyl functionality of 2 to 8 and an OH number of 20 to 400;
   (2) a mixture of ethylenically unsaturated monomers comprising styrene and acrylonitrile in amounts such that the weight ratio of styrene to acrylonitrile is from 80:20 to 20:80;
   (3) a preformed stabilizer; and
   (4) a free radical initiator,
   wherein the preformed stabilizer comprises a reaction product of a reaction mixture comprising:
      (a) an ethylenically unsaturated macromer;
      (b) an ethylenically unsaturated monomer; and
      (c) a free radical initiator, and
   wherein the ethylenically unsaturated macromer comprises a reaction product of a reaction mixture comprising:
      (a) an isocyanate residue that is an organic particulate having a mean particle size of 0.1 to 100 micron;
      (b) a polyol having a hydroxyl number of 20 to 75 and a hydroxyl functionality of 2 to 8; and
      (c) a hydroxyl-reactive compound containing reactive ethylenic unsaturation.

13. The polymer polyol of claim 12, wherein the organic particulate is an isocyanate residue that is a phosgenation product of toluene diamine containing less than 0.5% by weight of ortho-toluenediamine isomers, based on the total weight of toluene diamine.

14. The polymer polyol of claim 12, wherein the organic particulate is a residue from synthesis of 2,6-toluene diisocyanate and/or 2,4-toluene diisocyanate.

15. The polymer polyol of claim 12, wherein the organic particulate is present in the reaction mixture in an amount of at least 1% and up to 4% by weight, based on the total combined weight of reactants used to produce the macromer.

16. The polymer polyol of claim 12, wherein the hydroxyl-reactive compound that contains reactive ethylenic unsaturation comprises isopropenyl dimethyl benzyl isocyanate and the reaction mixture used to produce the macromere further comprises a diisocyanate.

17. A method comprising reacting a polyisocyanate with an isocyanate-reactive component comprising the polymer polyol of claim 12, wherein the reaction occurs in the presence of a blowing agent.

* * * * *